(12) United States Patent  
Tucker et al.

(10) Patent No.: US 11,893,994 B1  
(45) Date of Patent: Feb. 6, 2024

(54) PROCESSING OPTIMIZATION USING MACHINE LEARNING

(71) Applicant: Amazon Technologies, Inc., Seattle, WA (US)

(72) Inventors: Samuel Tucker, Minneapolis, MN (US); Agnika Kumar, Seattle, WA (US); Brett James Panosh, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 851 days.

(21) Appl. No.: 16/712,486

(22) Filed: Dec. 12, 2019

(51) Int. Cl.
*G10L 15/26* (2006.01)
*G06F 40/30* (2020.01)
*G06N 20/00* (2019.01)
*G06F 40/42* (2020.01)
*G06N 3/045* (2023.01)

(52) U.S. Cl.
CPC .............. *G10L 15/26* (2013.01); *G06F 40/30* (2020.01); *G06F 40/42* (2020.01); *G06N 20/00* (2019.01); *G06N 3/045* (2023.01)

(58) Field of Classification Search
CPC ... G10L 15/22; G10L 15/26; G10L 2015/223; G10L 2015/228; G10L 15/1815; G10L 15/1822; G10L 15/00; G10L 15/32; G10L 15/01; G10L 25/48; G06N 20/00; G06N 3/045; G06F 40/42; G06F 40/30
See application file for complete search history.

(56) References Cited

U.S. PATENT DOCUMENTS

| 11,244,321 B2* | 2/2022 | Wu .................. G06N 20/00 |
| 2014/0365209 A1* | 12/2014 | Evermann ............ G06F 40/35 704/9 |
| 2016/0110657 A1* | 4/2016 | Gibiansky ............ G06N 20/00 706/12 |
| 2018/0329998 A1* | 11/2018 | Thomson ............ H04N 21/2393 |

* cited by examiner

*Primary Examiner* — Angela A Armstrong
(74) *Attorney, Agent, or Firm* — K&L Gates LLP

(57) ABSTRACT

Devices and techniques are generally described for process optimization using reinforcement learning. In various examples, first input data is received and a first process for processing the first input data is determined. In some examples, a second process for processing the first input data is determined. A first machine learning model is used to generate a first prediction for processing the first input data by the first process. The first process and/or the second process are controlled based at least in part on the first prediction.

20 Claims, 8 Drawing Sheets

PROCESSING OPTIMIZATION USING MACHINE LEARNING

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A intent data processing application (often referred to as a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
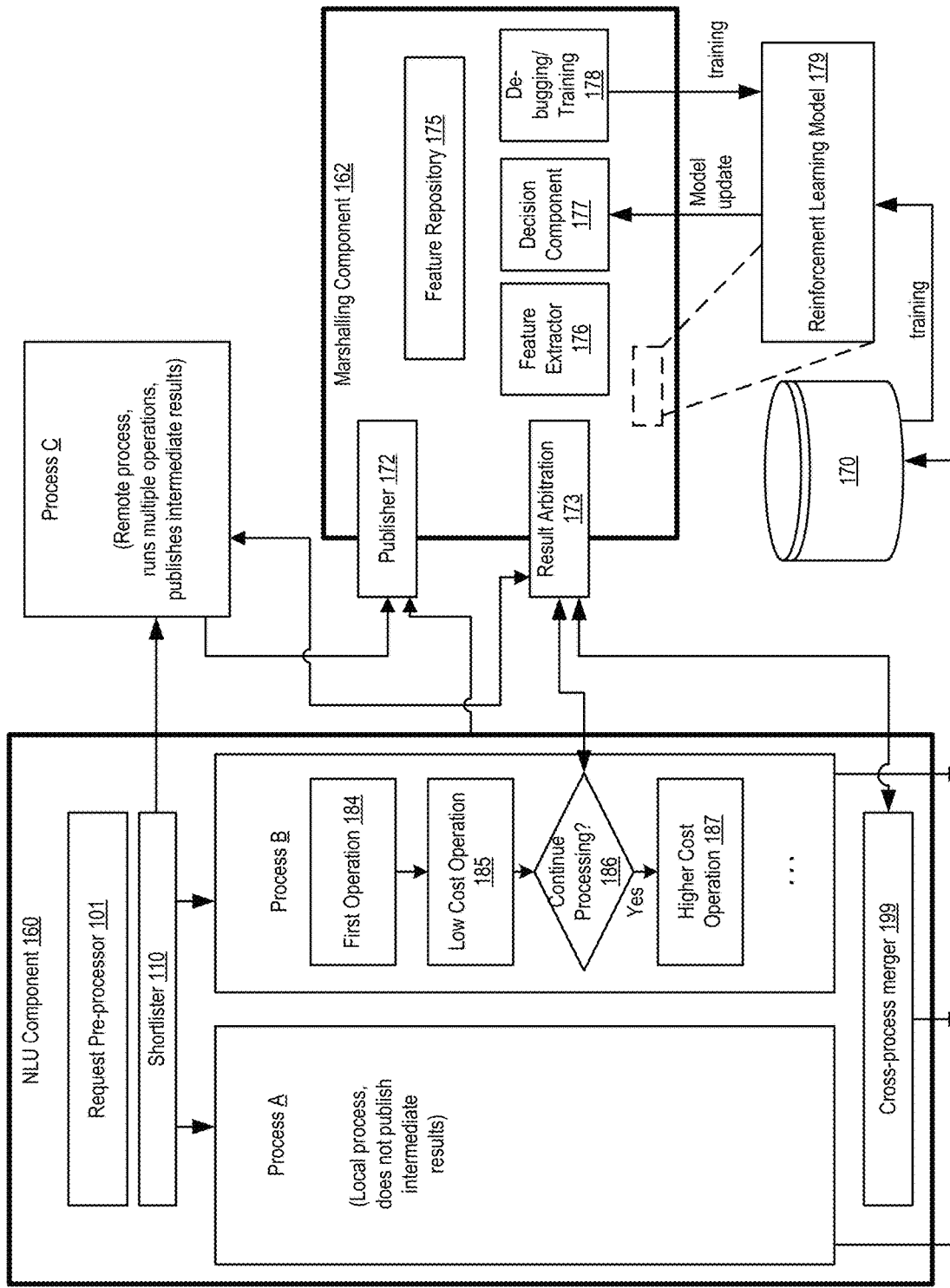
FIG. 1 is a block diagram illustrating an example system for process flow optimization using reinforcement learning, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

In various examples, an ensemble of machine learning models and/or a combination of machine learning-based and rule-based systems may be used to perform processing of input data. In various examples, multiple different processes may process the same input data to determine different results based on the constituent operations and characteristics of each individual process. For example, as described herein, multiple different natural language understanding (NLU) processes may be used to process input text data, and each process may determine a different semantic interpretation of the input text data based on the particular characteristics of the different processes.

Some processes involve computationally-expensive operations that may introduce latency into the processing of input data and/or consume computing resources (e.g., processor compute cycles, memory) during processing. Accordingly, the processes may proceed at different rates and some processes may complete processing prior to other, less computationally-expensive and/or latency intensive, processes. In various techniques described herein, such systems may be optimized for performance, latency, processing accuracy, and/or other desired characteristics using the various techniques and systems described herein. In particular, reinforcement learning techniques may be used during processing to predict the output of each process and/or to predict the amount of time it will take for each process to generate final output data based on incomplete results and/or past usage data. In some embodiments, the reinforcement learning model may predict which process is likely to yield the best result and/or the correct result (e.g., as determined post-facto and/or based on user feedback of the output result). Similarly, the reinforcement learning model may be used to predict if a process is likely to time out prior to returning a final result. In another embodiment, the reinforcement learning model may be used to predict if a process is likely to generate an incorrect result (e.g., as determined post-facto and/or based on user feedback). In some further examples, the reinforcement machine learning model may be used to predict that the best result, among multiple processes, will be returned by a first process at a time that is earlier than the results of other processes will be returned. Accordingly, the reinforcement learning model may generate a recommendation that processing for one or more other processes besides the first process be terminated prior to completion.

In another example embodiment, the reinforcement learning model may determine that the best result among the various processes will be determined by a first process after a designated timeout for the first process. Accordingly, if the reinforcement learning model is optimized for accuracy (e.g., relative to latency), the reinforcement learning model may recommend that the first process's timeout be extended so that the first process is able to return the result prior to timing out. Conversely, if the reinforcement learning model is optimized for latency (e.g., at the expense of accuracy), the reinforcement learning model may recommend that the first process be terminated or allowed to timeout, and that a less-accurate, but still relevant result from another process be returned and used as the final output of the parallel system.

In various examples, the various processes may each comprise multiple machine learning models and/or rule-based systems. One or more of such systems within a particular process may generate intermediate results. In various examples, the intermediate results may be sent to (or otherwise made available to) a marshalling component including and/or configured in communication with the reinforcement learning model. Such intermediate results may be used to generate feature data that may be used by the reinforcement learning model to generate the predicted outcomes described herein.

Conceptually, the reinforcement learning model may use a combination of intermediate result data generated by the various processes mid-processing, final result data generated by the various processes, timing information related to processing by the processes, etc., to generate predictions as to the timing and/or quality of the output of each process. For example, a NLU component of a speech processing system may include various NLU processes for determining a semantic interpretation of text data. The NLU component may have an NLU process that is specifically for answering questions, an NLU process for utterances classified as "complex," a core NLU process, etc. In an example, a complex utterance (or other natural language input) may be an utterance that includes two different intents, such as "Turn on the lights and play some music." In another example, a complex utterance may include multiple slots/entities in the same utterance, such as the utterance "Add apples and milk to my shopping list." In the foregoing example, "apples" and "milk" represent entities present in the utterance. In another example, a complex utterance may include an utterance that invokes multiple intents and/or intent data processing applications.

In various examples, a core NLU process may include a named entity recognition (ER) operation used to determine named entities present in input data, an intent classification operation used to classify intents present in input data, an anaphora resolution operation used to determine the meaning of words (e.g., pronouns) that obtain their meaning from preceding words or phrases in the utterance, a slot mapping operation to identify variable terms for defined intents, etc. The core NLU process may receive input data (e.g., text data typed by a user, text data generated by ASR that represents an utterance spoken by a user, etc.) and may determine NLU slot and intent data for the utterance for a particular intent data processing application. Examples of operations performed by NLU component 160 are described in further detail below in reference to FIG. 7.

Each NLU process (e.g., NLU process A, process B, and/or process C in FIG. 1) may receive input data comprising text data (e.g., text data typed by a user and/or determined by ASR for a spoken utterance) and may perform a series of operations in order to determine intent data (including slot data populated with recognized entities) representing a semantic interpretation of the input data. The various operations depend on the particular NLU process implementation. The various operations may be performed serially and/or in some combination of parallel and serial execution.

In the example, each NLU process may process text data representing an input user request in parallel. The final result of each NLU process may be data representing one or more speech processing skill-specific interpretations of the input text data. The marshalling component may use the reinforcement learning model to generate a prediction about the timing and output of each process based on incomplete information known about each process's processing of the input data at a given time. As more and more information is made available to the marshalling component, the prediction may be updated. For example, as more and more intermediate output data is generated by each process, the reinforcement learning model may form an updated prediction indicating which process's result is going to be the most satisfactory to the end user. Additionally, the reinforcement learning model may generate updated predictions as to when each process will output its final result data (e.g., Process A will return a result in +27 mS, process B will return a result in +40 ms, etc.). In various examples, each prediction of the reinforcement learning model may be associated with a confidence score indicating the model's confidence in that prediction.

Reinforcement learning is an area of machine learning related to maximizing a cumulative reward (e.g., reduced latency, accuracy of results, performance, etc.). Reinforcement learning differs from supervised learning in that labeled training data need not be provided, and sub-optimal actions need not be corrected. Instead, a balance between exploration of unknown decisions/outcomes and exploitation of known decisions/outcomes is determined. Reinforcement learning is often implemented as a Markov decision process (MDP).

In various examples herein, the process optimization techniques may be employed in the context of speech processing systems. This may be because speech processing systems may employ one or more components that include multiple machine learning model and/or rule-based processes that may be executed in parallel (or at least partially in parallel) with the results being merged and/or aggregated. As previously described, although speech processing systems are described herein in various illustrative embodiments, the techniques described herein are not limited to speech processing systems and may generally be used in any systems that employ multiple processing processes to perform processing.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., a user utterance) and may generate output audio data in response to the utterance.

In various examples, speech processing systems may determine an action to take for processing particular input data according to an interpretation of the input data determined by ASR and/or NLU. For example, a particular intent data processing application—sometimes referred to as a "skill"—may be selected to process input data based on a determination that the input data pertains to the particular skill. For example, a skill may be selected to process input data based on one or more intents and/or named entities determined during NLU processing of the input data. In another example, a speech processing system may determine an application that may generate a response to user input data that may be output via a TTS component of the speech processing system. Selection of the appropriate action and/or the appropriate speech processing component used to take the action and/or process the input data is non-trivial. In various examples described herein, user feedback may be used to select a skill that may be used to process a particular user input. In various examples, the user feedback may be explicit feedback that is requested from the user after processing the input data using a skill. In some other examples, the user feedback may be implicit feedback that is determined based on user behavior during and/or after input data processing by a skill (e.g., whether the user interrupts playback and/or requests that an action taken be stopped).

In various examples, a ranking component may be used to rank candidate skills for processing input data. In at least some examples, each candidate skill may be paired with a natural language interpretation of the input data that may be handled by the candidate skill. Such skill/interpretation pairs may be ranked by the ranking component according to a likelihood that a skill/interpretation pair is well-suited for processing the input data. In various examples, the machine learning model(s) of the ranking component may be trained and/or updated using user feedback. In some examples, machine learning models of the ranking component may generate ranked lists of skill/interpretation pairs using an input feature representing user feedback. For example, contextual data indicating past user feedback for a particular user and/or class of users resulting from processing the same or a similar input data may be used as an input feature to a machine learning model of the ranker component in order to provide personalized ranking results.

Described herein is a speech processing routing architecture that may be used to dynamically determine the appropriate action (e.g., the appropriate output) and/or the appropriate speech processing component to process given input data. In various examples, the speech processing routing architecture may be used to determine routing destinations for utterances and/or other natural language inputs for processing the inputs. The speech processing routing architecture may facilitate the routing of input data to appropriate skills and/or other speech processing components. In various examples, the speech processing routing architecture may use machine learning models trained using features computed using user feedback data, context data, and/or other predictive signals in order to determine the appropriate skill and/or other speech processing component to process input data. In various examples, using machine learning models to dynamically learn routing may improve the accuracy of the routing of speech processing requests, resulting in improved user experiences and/or more pertinent responses to user input data. For example, a machine learning system may dynamically learn from contextual data and/or user feedback data to provide routing exceptions and/or routing flexibility, in contrast to a deterministic routing system.

In at least some examples, various components of the speech processing system (including the routing architecture) may use multiple processes to return results. The results may be merged and/or aggregated. The various techniques described herein may be used to optimize the multiple processes and to recommend a final result, as described in further detail below.

Speech processing may be used in a variety of contexts, including in speech processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software from Nuance Communications of Burlington, Massachusetts, the Cortana system from Microsoft of Redmond, Washington, the Alexa system from Amazon.com, Inc. of Seattle, Washington, etc.

Speech processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network (e.g., network 198 of FIG. 5B), or by some combination of the speech processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., contextual data and/or any personal data) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A speech-controlled computing system may respond to user input data by outputting content and/or performing one or more other actions, such as initiating communications (e.g., synchronous phone/video calls and/or asynchronous messaging), playing music, providing information, calling a taxi, displaying an image, controlling other devices, etc. Generally, input data received by the various speech processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic interpretation of the inputs (e.g., semantic interpretation data). Skills may include any application effective to receive inputs from a natural language processing system in order to take one or more actions based on those inputs. For example, a speech processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

As previously described, in at least some examples, a "skill," "skill component," and the like may be software that is run by a third party to the herein disclosed speech processing system (e.g., a 3P skill developer), without the third party provisioning or managing one or more servers for executing the skill. In such an implementation, the system may be triggered to run a skill in response to the third party calling the system via the Internet or a mobile application.

In various examples, a speech processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing a user utterance spoken after the wakeword) may be sent to speech processing computing component(s) for further speech processing (e.g., ASR, NLU, etc.). In various examples, the wakeword detection component may be used to distinguish between audio that is intended for the speech processing system and audio that is not intended for the speech processing system.

FIG. 1 is a block diagram illustrating an example system for process optimization using reinforcement learning, according to various embodiments of the present disclosure.

The example depicted in FIG. 1 describes NLU component 160 that may be used to generate semantic interpretation data representing text data received as input by the NLU component 160. The NLU component 160 may be a part of a speech processing system, such as the speech processing system 100 depicted in FIG. 2. As shown in FIG. 1, the NLU component 160 may include multiple processes that may be used to process input text data. In FIG. 1, NLU component 160 includes Process A, representing a first process, and Process B, representing a second process. Additionally, in the example system depicted in FIG. 1, NLU component 160 may be configured in communication with Process C, representing a remotely-executing process. Each of the processes (e.g., Process A, Process B, and Process C) may include one or more machine learning models and/or one or more rule-based systems that may be used to generate a semantic interpretation of input text data. Request preprocessor 101 may be a component that is used to reformulate the input text data and/or other metadata into a format useable as input for the various downstream processes (e.g., Process A, Process B, and/or Process C).

In at least some examples, Process A, Process B, and Process C may be configured to generate semantic interpretations of input text data for each of a set of skills sent to the processes by a shortlister 110. As described in further detail below, shortlister 110 may be a machine learning-based speech processing component effective to predict a subset of skills that are likely to be able to process a given request from among all available skills. Shortlister 110 may send data indicating the subset of skills back to the various NLU processes (e.g., Process A, Process B, and Process C). Each of the processes may thereafter generate semantic interpretations of the input text data that are specific to the skills in the subset of skills indicated by the shortlister 110. For example, if shortlister 110 indicates that skills 1 and 2 are the most likely skills for correctly processing an incoming request, shortlister 110 may provide data identifying skills 1 and 2 to each of Process A, Process B, and Process C. Thereafter, each of Process A, Process B, and Process C may determine a first semantic interpretation of the input text data specific to skill 1 and a second semantic interpretation of the input text data specific to skill 2. The results from each process may be aggregated by cross-process merger component 199. The NLU output data determined by the cross-process merger component 199 (e.g., skill-specific interpretation data) may be sent to the dynamic routing architecture described in FIG. 2 for further processing. Marshalling component 162 may be a computer-implemented component (e.g., hardware, software, or some combination thereof) that may be used to optimize the processing by Process A, Process B, and Process C. In FIG. 1, Marshalling component 162 is depicted as a separate component from NLU component 160. However, in some examples, marshalling component 162 may be integrated into NLU component 160.

Generally, marshalling component 162 may receive incomplete data related to processing of text data by the NLU processes (e.g., Process A, Process B, and Process C) and may generate a prediction as to the outcome of each of the processes. Using this prediction, the marshalling component 162 may recommend one or more actions to be taken. The actions recommended by marshalling component 162 may be effective to optimize the NLU processing based on latency, accuracy, performance and/or some other desired metric.

In the example depicted in FIG. 1, Process A may an NLU process used to generate semantic interpretation data for input text data determined to be a user question for which a general knowledge answer is sought. Similarly, Process B may be a core NLU process used generally to determine semantic interpretation data for one or more skills (e.g., a subset of skills indicated by shortlister 110 as being appropriate to process a current user request). Process C may be an NLU process used to generate semantic interpretation data for input text data deemed to represent a complex utterance.

In the example of FIG. 1, Process A may not publish any intermediate results during processing. This may indicate that marshalling component 162 does not receive any intermediate results generated during processing of input data (e.g., results returned by one or more constituent machine learning models and/or rule-based systems of Process A). Instead, reinforcement learning model 179 of marshalling component 162 may receive data representing final processing results of Process A during offline training and/or as a runtime input signal representing past results of Process A.

Conversely, Processes B and C may publish intermediate results at various stages to marshalling component 162. Publishing of intermediate results may simply mean that interim, non-final results of processing by these processes may be sent to marshalling component prior to the processes returning final results. The particular processing stages at which these results are sent may be configured by the designers of the processes represented by the processes (e.g., in order to avail themselves of the processing optimizations offered by the marshalling component 162).

For example, Process B may receive input text data (e.g., as formulated by request pre-processor 101) and may perform a first operation 184 on the input text data. In various examples, the first operation 184 may generate some intermediate result data that may be sent to marshalling component 162 through publisher component 172 (e.g., an intermediate result data publishing application programming interface (API)). Feature extractor 176 may receive the intermediate result data. If the reinforcement learning model 179 uses the intermediate result data directly as feature data input to generate predictions, feature extractor 176 may act as a pass-through and may either send the intermediate result data (e.g., feature data) to reinforcement learning model 179 for prediction and/or may store the intermediate result data (e.g., feature data) in feature repository 175 for later prediction.

Conversely, one or more operations may be performed on the intermediate result data in order to generate feature data that is usable as input by the reinforcement learning model 179. In such a case, feature extractor 176 may perform the required computations in order to generate the feature data used by the reinforcement learning model 179 from the intermediate result data published by Process B.

Decision component 177 may be configured to determine a subset of features that are important for prediction from among all data provided to marshalling component 162 by the various processes. For example, as reinforcement learning by reinforcement learning model 179 proceeds over time, the model may learn that a particular feature generated from particular intermediate result data offers little predictive capacity. Decision component 177 may be configured to discard such intermediate result data as it offers little predictive value. Accordingly, decision component 177 may instruct feature extractor 176 not to store such features in feature repository 175. Feature extractor 176 may determine whether input feature data (e.g., intermediate results generated by Process B, etc.) is different from feature data of the subset of features determined by decision component 177 to be useful for prediction. The subset of features useful for prediction may be updated as the reinforcement learning model 179 learns over time (e.g., via exploitation/exploration policy).

Figure 3:
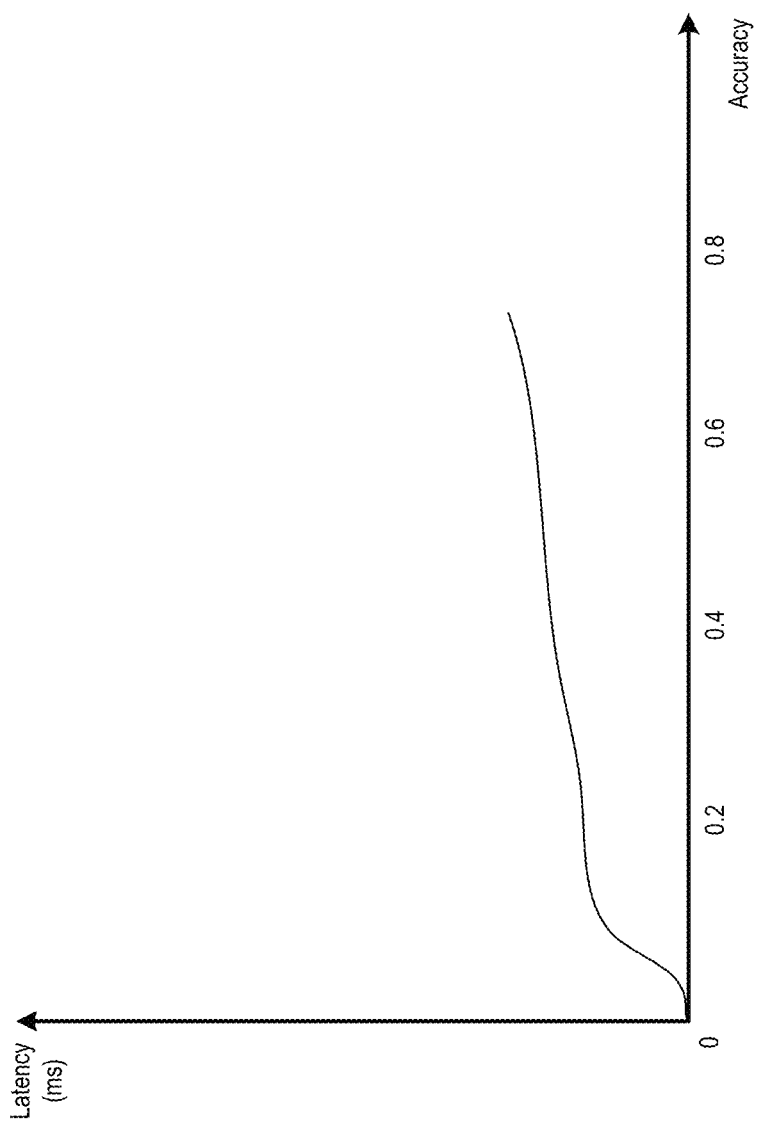
FIG. 3 is an example latency vs. accuracy curve that may be used in order to parameterize a reinforcement learning model, in accordance with various embodiments described herein.

Reinforcement learning model 179 may generate recommendations as output using the features stored in feature repository 175. The recommendations may include recommended actions such as continuing processing until final result data of the process is determined, adjusting timeout timing data, terminating and/or cancelling processing by one or more processes, etc. The recommendations may recommend that various processes (e.g., process A, process B, and/or process C) be allowed to determine final result data and/or that various processes should be terminated prior to generating final result data. The reinforcement learning model 179 may be jointly optimized for accuracy, user feedback, latency, and/or other parameters. The specific optimization (e.g., the specific cost function) used to train reinforcement learning model 179 may be implementation-dependent. For example, FIG. 3 depicts an example of a latency vs. accuracy curve that may be used to optimize the reinforcement learning model 179 according to a selected point along the curve. In some examples described herein, reinforcement learning model 179 may be a separate component relative to a component that is executing the relevant processes (e.g., NLU component 160 in the example depicted in FIG. 1). Accordingly, rather than directly controlling the processing by the various processes, reinforcement learning model 179 and marshalling component 162 may generate recommendations for processing that may either be acted on or ignored by the NLU component 160 (and/or by the relevant system controlling the execution of the processes). In the example depicted in FIG. 1, cross-process merger component 199 may control the execution of the processes and may receive recommendations (e.g. recommendation data) generated by the reinforcement learning model 179. The recommendation data generated by reinforcement learning model 179 may be a recommendation used to optimize for the various parameters for which the reinforcement learning model 179 has been trained. For example, if the reinforcement learning model 179 is optimized for accuracy at the expense of latency, the reinforcement learning model 179 may generate a recommendation that process A be allowed to complete where process A is predicted to generate the most accurate result (even where generation of the final result by process A may result in significant latency).

In various examples, reinforcement learning model 179 may continually update recommendations as more and more intermediate result (and/or final result) data becomes available from the various processes. In the NLU component 160 example depicted in FIG. 1, the output of reinforcement learning model 179 may be confidence scores indicating a confidence of the reinforcement learning model 179 in various recommendations. Recommendations may be based on a prediction as to whether an input request to the NLU component will time out (e.g., none of the processes will return a final result prior to an NLU timeout that applies to all processes). Recommendations may be based on a prediction that a particular process will return a useful result (e.g., semantic interpretations that correspond to the user's intent, as determined and/or corroborated by user feedback). The notion of a useful result may be validated based on downstream results. For example, user satisfaction data associated with a particular semantic interpretation for a particular skill based on an input text data hypothesis may indicate that users are highly-satisfied with this speech processing result. Accordingly, reinforcement learning model 179 predicting that a final result of a process will be "useful" may indicate that the result is likely to result in user satisfaction (based on past usage data). Similarly, reinforcement learning model 179 may predict that a final result of a process will be incorrect (e.g., unlikely to result in user satisfaction). In other examples, reinforcement learning model 179 may predict that a particular process will return the best result (e.g., the result that is most likely to result in the highest user satisfaction) among all processes, but that the particular process will time out prior to returning the result. The foregoing are illustrative examples of recommendations of the reinforcement learning model 179, however, other recommendations may be generated based on the particular implementation (e.g., according to the definition of the cumulative reward of the reinforcement learning model 179, based on various constraints of the model, etc.).

Recommendations of the reinforcement learning model 179 may be updated as additional feature data is made available to the reinforcement learning model 179 by the marshalling component 162 during NLU processing. For example, after receiving a first intermediate result from Process B at time to the reinforcement learning model 179 may generate a first prediction with a first confidence score. Later, after receiving a second intermediate result from Process B (and/or from another process) at time t1, the reinforcement learning model 179 may generate a second prediction with a second confidence score.

Result arbitration component 173 may be an API of marshalling component 162 through which marshalling component 162 provides prediction data and/or recommendation data to NLU component 160. For example, based on the various recommendations described above, the reinforcement learning model 179 may recommend various actions for the NLU component 160 to take. For example, the reinforcement learning model 179 may determine an 85% confidence score that Process A will generate a correct result, a 40% confidence score that Process B will generate a correct result, and a 60% confidence score that Process C will generate a correct result. Reinforcement learning model 179 may generate recommendation data recommending that Process A be allowed to complete processing to generate the best result. Further, reinforcement learning model 179 may recommend that processing by Process B be terminated and that processing by Process C be allowed to complete so that Process C's result may be used as a fallback result (e.g., fallback output of the process), whereas Process A's output may be used as the primary output.

In another example, reinforcement learning model 179 may determine a 70% confidence score that Process B will return the correct result and a 60% confidence score that Process C will return the correct result. Further, reinforcement learning model 179 may determine (e.g., with a 70% confidence score) that Process B will take 200 additional milliseconds to return the correct result, and that Process B will take 15 additional milliseconds to return the correct result. Reinforcement learning model 179 may be tuned with parameters and/or hyperparameters related to latency, accuracy, performance, etc., as described in further detail below. In the current example, if reinforcement learning model 179 optimizes for latency, reinforcement learning model 179 may generate recommendation data recommending that processing by Process B be terminated and that processing by Process C be allowed to complete processing in order to return the result. In this example, although the reinforcement learning model 179 has predicted that Process B may ultimately return a better result, the reinforcement learning model 179 may determine that returning Process C's result more quickly may provide the best return in terms of the cumulative reward defined for the model. Additionally, in some examples, the reinforcement learning model 179 may determine that the process that will generate the best result will timeout before generating the result. Depending on how the cumulative reward for the reinforcement learning model 179 is defined, the reinforcement learning model 179 may either recommend extending the timeout so that the process may return the result (e.g., reinforcement learning model 179 optimized for accuracy) or may recommend terminating processing by the process and returning some other, potentially less-accurate result (e.g., reinforcement learning model 179 optimized for latency).

Processes may be designed in such a way as to avail themselves of the benefits of the marshalling component 162. For example, Process B may include a sequential processing flow whereby a first operation 184 occurs, followed by a low-cost operation 185. Operation 185 may be low-cost in terms of latency and/or in terms of consumption of computing resources. Thereafter, processing Process B may proceed to a higher-cost operation 187. Operation 187 may be high-cost in terms of latency and/or compute resources relative to low-cost operation 185. In an example, higher-cost operation 187 may be a network call to a remote processing component that may introduce significant latency into the processing by Process B. Accordingly, prior to execution of the higher cost operation 187, the Process B may be designed in such a way that a decision is made at action 186 whether or not to continue processing. For example, at action 186, Process B may call to marshalling component 162 (e.g., through result arbitration component 173). In the example, Process B may be configured to terminate processing prior to higher-cost operation 187 if the current recommendation by reinforcement learning model 179 indicates that Process B processing should be terminated at the current time. In an example, Process B may perform a check that a threshold confidence score has been generated in accordance with the recommendation. For example, Process B may terminate processing if a recommendation that Process B should terminate processing generated by reinforcement learning model 179 is associated with a confidence score that is greater than 75%. Accordingly, in the above example, the threshold confidence score controls whether the process is interrupted (e.g., in response to the confidence score that Process B should terminate processing exceeding the threshold confidence score).

In another example, rather than (or in addition to) communicating directly with individual processes, marshalling component 162 may communicate with cross-process merger component 199. For example, marshalling component 162 may send recommendation data from reinforcement learning model 179 to cross-process merger component 199 through result arbitration component 173. Cross-process merger component 199 may include logic that may determine whether or not to take one or more actions recommended by the recommendation data. For example, cross-process merger component 199 may include logic to determine if the confidence scores provided as part of the recommendation data pass various confidence score thresholds prior to taking the recommended action. Additionally, cross-process merger component 199 may have certain "white-listed" and/or "black-listed" actions that may be used to approve and/or deny recommended actions. For example, cross-process merger component 199 may include logic that indicates that no recommended actions may be taken with respect to Process A (e.g., Process A is included on a black list). Conversely, cross-process merger component 199 may include logic that indicates that timeouts for Process B may be extended by no more than 100 ms in accordance with a recommendation. The ultimate results generated by NLU component 160 (e.g., NLU output data including data identifying skills and corresponding skill-specific semantic interpretation data) may be sent by cross-process merger component 199 to downstream routing components (shown and described in FIG. 2) as well as to a non-transitory computer-readable memory 170. NLU output data stored in non-transitory computer-readable memory 170 may be used to train reinforcement learning model 179. In addition, non-transitory computer-readable memory 170 may store user feedback data related to user feedback resulting from a particular NLU interpretation generated by a particular NLU process (e.g., NLU process A, B, and/or C). For example, reinforcement learning model 179 may learn which recommendations produce the most optimal NLU output data in terms of the cumulative reward constraints provided to the reinforcement learning model. In addition, de-bugging/training component 178 of marshalling component 162 may send data received offline and/or from downstream speech processing components to reinforcement learning model 179. For example, de-bugging/training component 178 may store user feedback that may be used to retrain the reinforcement learning model 179. User feedback data may indicate, for example, whether the user ultimately rejected the action that was recommended by the reinforcement learning model 179.

Figure 2:
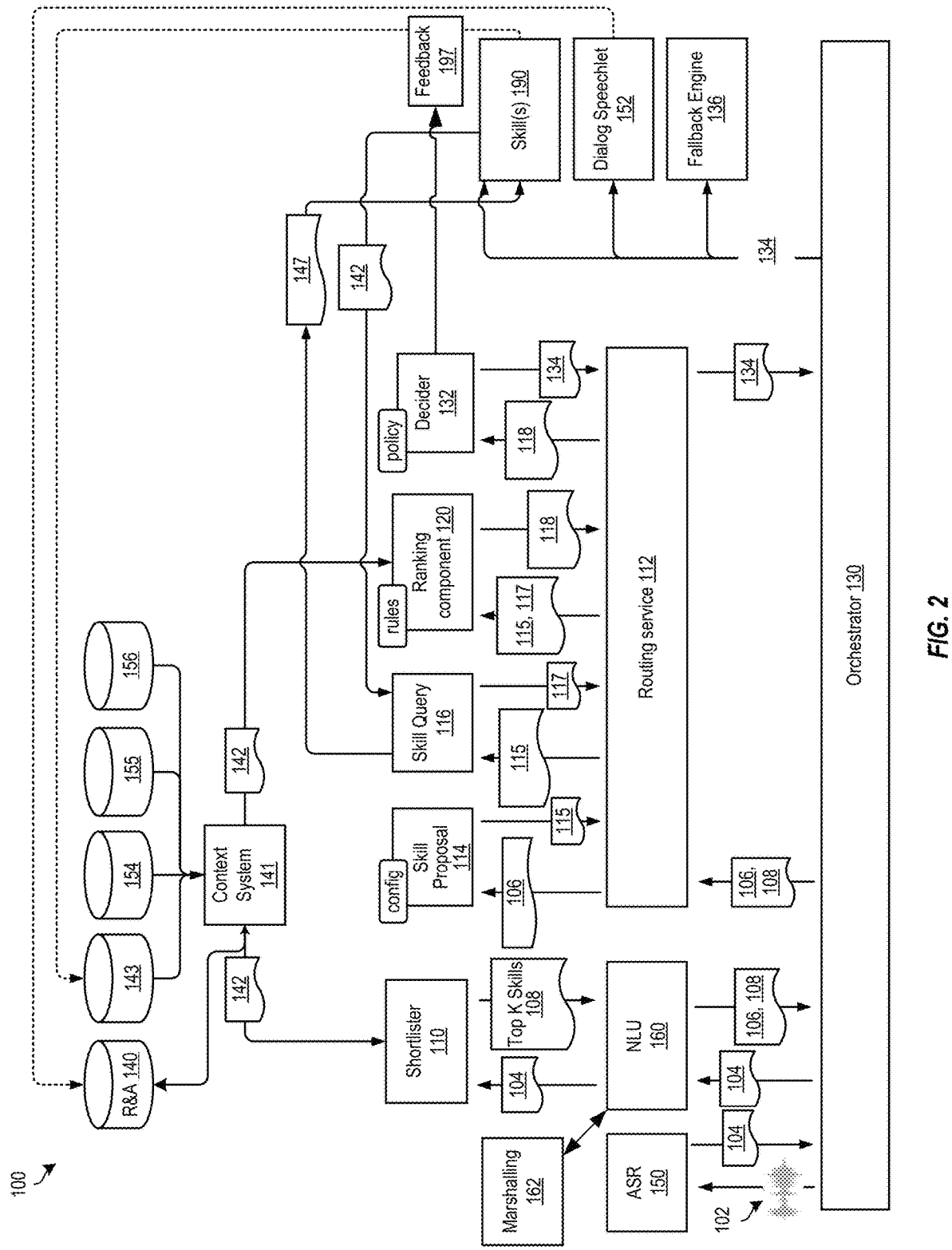
FIG. 2 is a block diagram illustrating an example speech processing routing architecture, according to various embodiments of the present disclosure.

FIG. 2 is a block diagram illustrating an example speech processing routing architecture, according to various embodiments of the present disclosure. The various components illustrated FIG. 2 may be located on the same or different physical devices. Communication between various components illustrated in FIG. 2 may occur directly or across a network. A speech processing-enabled device may capture audio using an audio capture component, such as one or more microphone(s). The speech processing enabled device may send audio data 102 (e.g., corresponding to an utterance) to an orchestrator 130 of the speech processing system 100. The speech processing enabled device may also send metadata (e.g., including device identifiers, device type data, contextual data, IP address data, room location data, etc.) to the orchestrator 130. The components depicted in FIG. 2, including components of a speech processing system may be generally referred to as spoken language processing components, a speech processing system 100 a spoken language processing system, speech processing components, and/or a speech processing routing system. Additionally, in various examples, the components depicted in FIG. 2 may process written input (e.g., text data) in addition to spoken input.

Upon receipt by the speech processing system 100, the audio data 102 may be sent to an orchestrator 130. The orchestrator 130 may include memory and logic that enables the orchestrator 130 to initiate a dialog session and to transmit various pieces and forms of data to various components of the system, as described in further detail below.

The orchestrator 130 may send the audio data 102 to an ASR component 150 (e.g., a speech recognition component). The ASR component 150 may transcribe the audio data 102 into one or more hypotheses representing speech contained in the audio data 102. The ASR component 150 interprets the speech in the audio data based on a similarity between the characteristics of the audio data corresponding to the speech and pre-established language models. For example, the ASR component 150 may compare the audio data 102 with models for sounds (e.g., subword units such as phonemes) and sequences of sounds to identify words that match the sequence of sounds in the speech represented in the audio data 102. The ASR component 150 may send text data 104 generated thereby to orchestrator 130 that may, in turn, send the text data 104 to NLU component 160. As previously described, the text data 104 may include one or more ASR hypotheses. The text data 104 may include a top scoring hypothesis of the speech represented in the audio data 102 or may include an N-best list including a group of hypotheses of the speech represented in the audio data 102, and potentially respective scores ASR processing confidence scores. As previously described, in some other examples, the ASR component 150 (and/or other components of the speech processing system 100) may generate other metadata associated with the utterance such as an overall utterance confidence score, per-word (e.g., per token) confidence scores for the utterance, utterance duration, stream duration (e.g., duration of the stream of audio data from speech processing enabled device to speech processing system 100), a number of tokens output by ASR, etc.

The NLU component 160 attempts to make a semantic interpretation of the phrases or statements represented in the text data input therein. That is, the NLU component 160 determines one or more meanings associated with the phrases or statements represented in the text data 104 based on individual words represented in the text data 104. The NLU component 160 interprets a text string to derive an intent of the user (e.g., an action that the user desires be performed) as well as pertinent pieces of information in the text data that allow a device (e.g., the speech processing enabled device, the speech processing system 100, a computing device(s) implementing a skill, etc.) to complete the intent. For example, if the text data 104 corresponds to "Set temperature to 74 degrees," the NLU component 160 may determine the user intended to invoke a climate intent with a target temperature value slot of 74 degrees Fahrenheit. As previously described, in addition to the NLU intent and slot data, the NLU component 160 may generate other metadata associated with the utterance (e.g., with the audio data 102). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc. Herein, the data output by the NLU component 160 (depicted in FIG. 1 as "NLU 160") is referred to as NLU output data 106.

NLU component 160 may send the text data 104 and/or some of NLU output data 106 (such as intents, recognized entity names, slot values, etc.) to a shortlister 110. The shortlister 110 may comprise one or more machine learning models that may be effective to predict a subset of skills that are most likely to be able to correctly process the input data, based on the input of the text data 104 and/or the NLU output data 106. In addition, the shortlister 110 may call the ranking and arbitration component 140 to request features pre-computed by the ranking and arbitration component 140 according to features used as inputs by the machine learning models of shortlister 110. As previously described, the shortlister 110 may define source data used to compute the features and/or may specify functions used to generate the features from the source data (e.g., formulae and/or functions) prior to runtime processing of input data. The ranking and arbitration component 140 may precompute the features according to the specified feature definitions supplied by shortlister 110 and by the other components of speech processing system 100 and may store the precomputed features in memory. Ranking and arbitration component 140 may generate indexes that may be used to retrieve the precomputed features during runtime (e.g., through an API). Accordingly, during runtime processing, shortlister 110 may retrieve the precomputed features from ranking and arbitration component 140 and may use the precomputed features (among other inputs) to predict a subset of skills that are most likely to be appropriate to process the current input data. Accordingly, shortlister 110 may send the top K skills 108 to NLU component 160. NLU component 160 may thereafter perform skill-specific NLU processing for the skills in the top K skills 108 to determine skill-specific intents, slots, and/or named entities. NLU output data 106 may include such skill-specific data (e.g., skill-specific N-best hypotheses).

In various examples, and as described above in reference to FIG. 1, there may be multiple NLU processes (e.g., Process A, Process B, and Process C in FIG. 1) that may perform the skill-specific NLU processing for the skills in the top K skills 108. An example of an NLU process, such as NLU processes A, B, and/or C, is described below in FIG. 7. Additionally, one or more other components of the speech processing system 100 depicted in FIG. 2 may include multiple processes that are processed in parallel to determine output data. Such systems may benefit from recommended actions by marshalling component 162, as described above in FIG. 1. The marshalling component 162 may use reinforcement learning and intermediate results from one or more of the processes to generate a recommended action that may improve performance, accuracy, and/or improve latency, as described above. In FIG. 2, the marshalling component is depicted in communication with NLU component 160, in accordance with the description of FIG. 1, above. However, other speech processing components depicted in FIG. 2 may use marshalling components to recommend different actions in order to optimize processing.

Ranking and arbitration component 140 may communicate with various systems in order to obtain source data used to precompute features. For example, ranking and arbitration component 140 may communicate with feedback storage 143 to receive user feedback data (e.g., explicit and/or implicit user feedback related to user satisfaction with processing of input data). In various examples, the user feedback data may be user-specific and/or device specific and may indicate whether a user was satisfied or not satisfied with a particular interaction with speech processing system 100. As previously discussed, in various examples user feedback data may be predicted for input data prior to processing the input data using a skill 190. In various examples, user feedback data may be used to pre-compute various features used by machine learning models of speech processing system 100. Accordingly, in some examples, the skills selected for processing particular input data may be determined based at least in part on skills that a user (or a group of similar users) has responded positively to in the past.

Additionally, ranking and arbitration component 140 may communicate with endpoint context system 154, which may provide context data at the conclusion of a user interaction with the speech processing system 100. In another example, ranking and arbitration component 140 may communicate with skill data 156 to determine information from the skill regarding past interactions with the skill and/or data acquired by the skill. Additionally, ranking and arbitration component 140 may communicate with other data sources 155, as new services are added and/or as new data types that may be useful for routing prediction are made available. In addition to ranking and arbitration component 140 using context data 142 to precompute features used by various machine learning models of the routing architecture of the speech processing system 100, a context system 141 may receive the context data 142. The context system 141 may provide the context data directly to both ranking and arbitration component 140 as well as to various components of the routing architecture of speech processing system 100.

For example, the context system 141 may send context data 142 to shortlister 110 and/or ranking component 120 in order to determine a shortlist of skills 190 for particular input data and/or in order to rank the shortlisted skills.

NLU output data 106 and top K skills 108 may be sent by NLU component 160 to orchestrator 130. Orchestrator 130 may send the top K skills 108 and the NLU output data 106 to routing service 112. Routing service 112 may send the top K skills 108 and NLU output data 106 to skill proposal component 114. Skills 190 may subscribe to particular intents using skill proposal component 114. Accordingly, skill proposal component 114 may receive the NLU output data 106 and may determine whether any of the included intents correspond to one or more of skills 190. If so, skill proposal component 114 may generate candidate data comprising <Intent, Skill> candidate pairs 115. The candidate pairs 115 may be sent to routing service 112 and may be sent by routing service 112 to skill query service 116. Skill query service 116 comprises an API through which skills 190 may "opt out" of particular requests. For example, a skill 190 may comprise a video playback skill. Accordingly, the skill 190 may register with skill query service 116 to indicate that only requests made on a device with a display screen should be routed to the particular skill 190. In addition, skills 190 may communicate availability information, pricing information, and/or other structured descriptions of how and under what circumstances (e.g., determined using context data) the skill 190 can fulfill a request represented by the current input data. Skill query service 116 may send a signal 117 indicating what skills can fulfill a particular request (and/or what skills are unable to fulfill the request). The signal 117 may be sent to routing service 112. Routing service 112 may send the signal 117 along with the candidate pairs 115 to a ranking component 120. As depicted in FIG. 2, skills 190 may send context data 142 to skill query service 116 to indicate situations in which a skill may opt out of processing a particular request (e.g., if the device sending the input data does not include a display screen, etc.). In various examples, the context data 142 sent by skills 190 to skill query service 116 may be skill and/or request specific context data. Additionally, skill query service 116 may send intent requests 147 to skills 190.

Ranking component 120 may include one or more statistical machine learning models effective to rank the candidates included in candidate pairs 115. In order to rank the candidate pairs 115, ranking component 120 may generate confidence scores for each corresponding candidate pairs 115. A confidence score may indicate that the corresponding skill 190 and/or intent of the candidate pair is appropriate to process the request. Ranking component 120 may compute features using the candidate pairs 115 and signal 117 in order to predict the ranking of the skills 190 included in the candidate pairs 115. The features computing during processing of the input data (sometimes referred to as "runtime features") may comprise a feature representation of the list of candidate pairs 115 and/or a representation of the signal 117. Additionally, ranking component 120 may query ranking and arbitration component 140 for precomputed features that have been defined for use by ranking component 120. As previously described, the precomputed features may be determined based on contextual data, user feedback data, past usage data, skill data, previous rankings of ranking component 120, etc. Additionally, ranking component 120 may compute runtime features using context data 142, user feedback data from feedback storage 143, and/or other data sources. In various examples, the loss function for the machine learning models of ranking component 120 may optimize based on user satisfaction scores computed using user feedback data from feedback storage 143.

Ranking component 120 may generate a ranked list 118 of the candidate skills indicated in candidate pairs 115. In at least some examples, the ranking component 120 may use a deep neural network as a machine learning model for determining the ranked list 118. In some examples, ranking component 120 (and/or some other speech processing system 100 component, such as decider engine 132) may determine plan data that may override the ranked list 118 such that a lower ranked skill among the candidate pairs 115 may be selected for processing the input data. In various examples, the confidence scores for skill-specific interpretations output by reinforcement learning model 179 may be used by ranking component 120 to generate the ranked list. As such, candidate pairs that include skill-specific NLU interpretations with high confidence scores (from reinforcement learning model 179) may be more highly ranked by ranking component 120, in some examples.

In another example, the decider engine 132 may store policies that may control whether or not explicit user feedback is solicited (e.g., via TTS) after the completion of an action (e.g., by the top-ranked skill determined by the ranker component). In various examples, such feedback data may be used to train reinforcement learning model 179. In some other examples, such feedback data may be used as a feature during prediction by reinforcement learning model 179. Explicit feedback may be solicited through the dialog speechlet 152 prior to routing input data to a skill for processing. In another example, decider engine 132 may control feedback component 197 to request explicit feedback from a user post-skill processing (e.g., via TTS). In various examples, feedback component 197 may ask the user whether or not the user was satisfied with the action taken by the speech processing system 100. In yet another example, an exploration policy defining a dynamic routing adjustment may send input data that matches predicate data defined using the dynamic routing adjustment component to a newly-implemented skill 190. The decider engine 132 may determine that the top ranked result from the ranking component 120 should be ignored due to the dynamic routing adjustment being performed by the dynamic routing adjustment component. Additionally, in some examples, a policy of the decider engine 132 may be to solicit explicit feedback from the user whenever a new skill is routed to due to a dynamic routing adjustment. Accordingly, at the completion of the action, the decider engine 132 may control TTS to inquire as to whether the user was satisfied with the interaction with the new skill and/or whether the performed action was the action intended by the user.

Decider engine 132 may output plan data that comprises a routing plan 134 for processing the input data. The routing plan 134 may define a target skill 190 to process the input data. As described above, the target skill 190 may be selected as the top-ranked hypothesis determined by the ranking component 120. In some other examples, the decider engine 132 may select a target skill 190 based on a policy, as described above. In some examples, the ranking component 120 may determine that two different skills are equally applicable for processing the input data. In such examples, the decider engine 132 may determine that disambiguation should occur. Accordingly, the routing plan 134 may include sending the input data to a dialog speechlet 152 that may output (via TTS) one or more questions (e.g., a disambiguation request) used to prompt the user to disambiguate between the two equally likely (or approximately equally likely) interpretations of the input data. For example, it may be unclear, based on a user's request, whether the user intended to invoke a movie playback skill or a music playback skill, as a movie and a soundtrack for the movie may be identified using the same name. Accordingly, the decider engine 132 may determine that the top two hypotheses of ranking component 120 are equally likely (or approximately equally likely) and may determine that a question should be asked to disambiguate between the two possible actions. Accordingly, the routing plan 134 may route the input data to the dialog speechlet 152, and the dialog speechlet 152 may inquire whether the user intended to play the movie or the soundtrack.

In another example, the decider engine 132 may determine that the user was not satisfied with the top hypothesis of the ranking component 120 (e.g., due to explicit or implicit feedback received from the user in response to taking an action associated with the top ranking component 120 hypothesis). Accordingly, the decider engine 132 may determine that the routing plan 134 should be to determine the second highest ranked hypothesis of the ranking component 120. The routing plan 134 may be sent to the fallback engine 136. In various examples, the fallback engine 136 may determine a list of the top hypotheses, top intents, and/or top ASR text interpretations from the previous turn of dialog, and may select a fallback option for processing the input data from the lists.

FIG. 3 is an example latency vs. accuracy curve that may be used in order to jointly optimize a reinforcement learning model using various constraints, in accordance with various embodiments described herein. As depicted in FIG. 3, as an increased amount of processing time passes, the accuracy of the results may improve. Accordingly, for a particular application, an acceptable point on the latency vs. accuracy curve may be selected and may be used as a parameter (or hyperparameter) of the reinforcement learning model 179 so that the reinforcement learning model 179 optimizes for latency and/or accuracy based on the selected point on the curve. Since not all systems have the same performance constraints, using a point on such a curve (e.g., cost vs. accuracy, latency vs. accuracy, latency vs. performance, etc.) allows the marshalling component 162 to be scalable to other systems beyond the NLU example described above.

Figure 4:
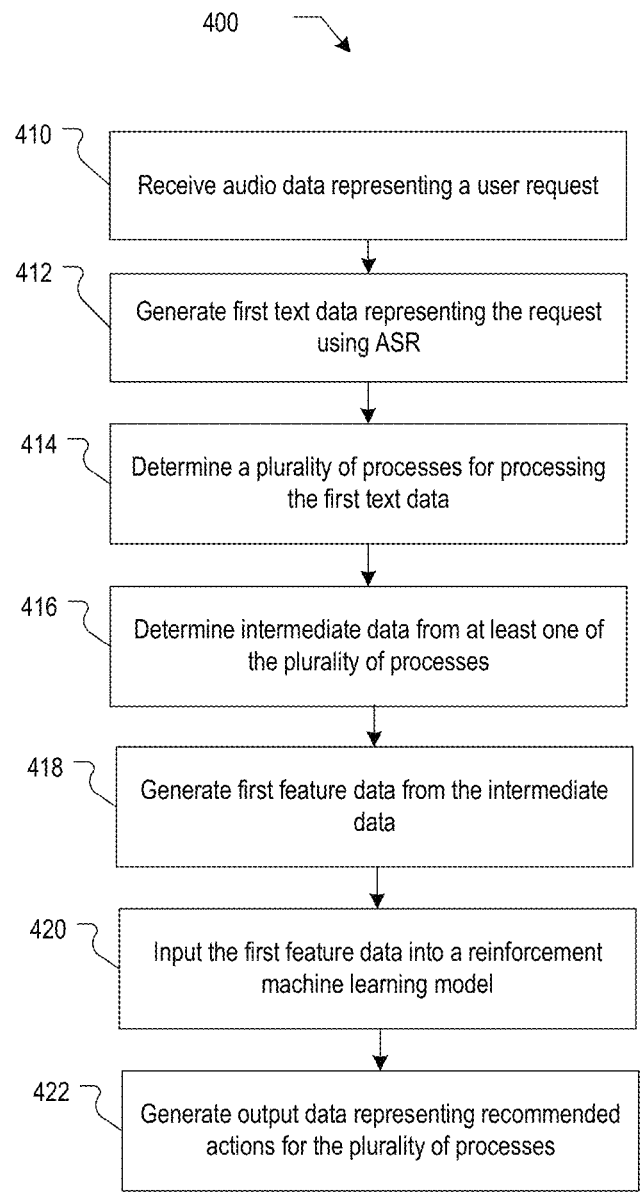
FIG. 4 depicts a flow chart showing an example process for using reinforcement learning to generate a recommended action for multiple processes of a natural language understanding system, in accordance with various embodiments described herein.

FIG. 4 depicts a flow chart showing an example process 400 for using reinforcement learning to generate a recommended action for multiple processes of a natural language understanding system, in accordance with various embodiments described herein. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

The process 400 may begin at action 410, at which audio data representing a user request may be received by a speech processing system. In various examples, the orchestrator 130 may generate a dialog session in response to receipt of the audio data. Processing may continue to action 412, at which first text data representing the audio data may be generated by ASR component 150. The text data hypotheses generated by ASR component 150 may be sent to NLU component 160 for natural language processing.

Processing may continue at action 414, at which a plurality of processes for processing the first text data may be determined. The plurality of processes may include different NLU processing processes, as described above in reference to FIG. 1. In various examples, the processing of each process may occur in parallel and there may be a merger component (e.g., cross-process merger component 199) that may aggregate the outputs from the NLU component 160.

Processing may continue from action 414 to action 416, at which intermediate data may be determined from at least one of the plurality of processes. For example, after completing one or more operations, (e.g., first operation 184, low cost operation 185, etc.), the data generated as a result of competing the one or more operations may be sent to the marshalling component. Processing may continue from action 416 to action 418, at which the marshalling component 162 may generate first feature data from the intermediate data determined at action 416. The feature data may be generated by feature extractor 176 and may be stored in feature repository 175. Processing may continue from action 418 to action 420, at which the first feature data may be input into reinforcement learning model 179. Additionally, other feature data may be input to reinforcement learning model 179 (e.g., user feedback data, final result data, process timeout data, etc.). Processing may continue from action 420 to action 422, at which output data may be generated by the reinforcement learning model 179. The output data may include recommendation data for recommending an action to be taken by the NLU component 160. Actions may include recommendations that certain processes should be terminated, that timeouts for certain processes should be extended, that various intermediate results should be used as final results for a process, that particular process results are favored over others, etc. In addition, the output data may comprise confidence scores related to each recommended action. The confidence scores may represent the reinforcement learning model's confidence in each recommended action. The output data may be sent to the cross-process merger component 199 which may act on the output data according to the logic of the cross-process merger component 199.

Figure 5A:
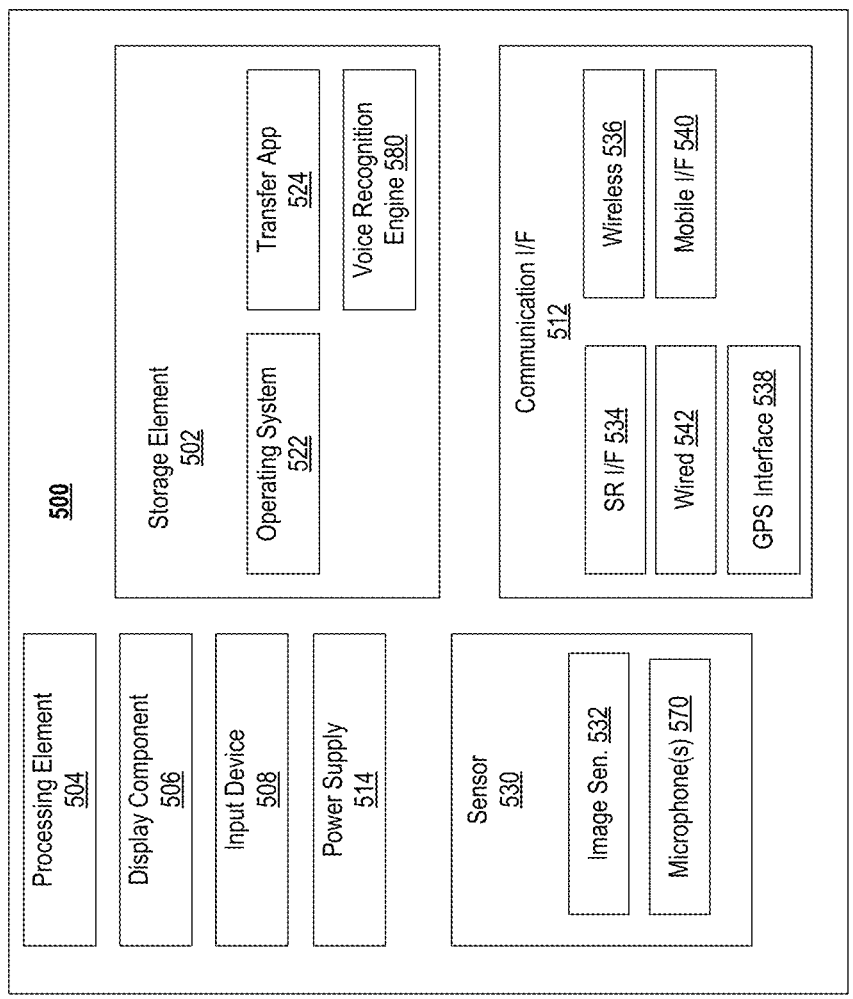
FIGS. 5A-5B are block diagrams showing example architectures of computing devices that may be used in accordance with various embodiments described herein.

FIG. 5A is a block diagram showing an example architecture 500 of a computing device that may be used to implement, at least in part, speech processing system 100, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine a wakeword and/or to stream audio data to speech processing system 100. The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500. In some examples, the transfer application 524 may also be configured to send the received voice requests to one or more voice recognition servers (e.g., speech processing system 100).

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display content determined provided by a skill executed by the processing element 504 and/or by another computing device.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. Voice recognition engine 580 may interpret audio signals of sound captured by microphone 570. In some examples, voice recognition engine 580 may listen for a "wakeword" to be received by microphone 570. Upon receipt of the wakeword, voice recognition engine 580 may stream audio to a voice recognition server for analysis, such as speech processing system 100. In various examples, voice recognition engine 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5A. An example of an image sensor 532 may be a camera configured to capture color information, image geometry information, and/or ambient light information.

Figure 5B:
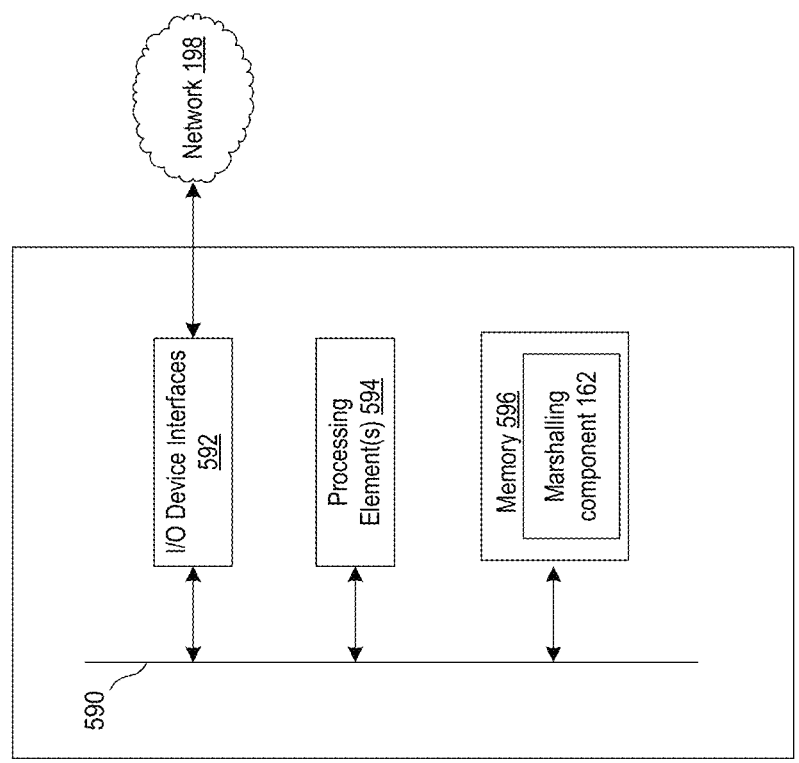

FIG. 5B is a block diagram conceptually illustrating example components of a remote device, such as a computing device executing a particular skill 190, a computing device executing one or more components of speech processing system 100 (e.g., ASR processing components, NLU processing components, etc.) and/or command processing. Multiple computing devices may be included in the system, such as one speech processing computing device for performing ASR processing, one speech processing computing device for performing NLU processing, one or more skill computing device(s) implementing skills 190, etc. In operation, each of these devices (or groups of devices) may include non-transitory computer-readable and computer-executable instructions that reside on the respective device, as will be discussed further below.

Each computing device of speech processing system 100 may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular input data. In some examples, memory 596 may store machine learning models of the marshalling component 162, ranking component 120, skills 190, shortlister 110, etc., when loaded from memory 596. In various further examples, memory 596 may be effective to store instructions effective to program controllers/processors 594 to perform the various techniques described above in reference to ranking and arbitration component 140, decider engine 132, and/or the marshalling component 162 described above in reference to FIGS. 1-4. Accordingly, in FIG. 5B, marshalling component 162 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of speech processing system 100 may also include memory 596 for storing data and controller/processor-executable instructions. Each memory 596 may individually include one or more non-volatile storage types such as magnetic storage, optical storage, solid-state storage, etc. Each computing device of speech processing system 100 may also be connected to removable or external non-volatile memory and/or storage (such as a removable memory card, memory key drive, networked storage, etc.) through respective input/output device interfaces 592. In various examples, the feature data described above in reference to ranking and arbitration component 140, may be stored in memory 596.

Computer instructions for operating each computing device of speech processing system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of speech processing system 100 may include an address/data bus 590 for conveying data among components of the respective device. Each component within a computing device of speech processing system 100 may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of the speech processing system 100, as described herein, are exemplary, and may be located as a stand-alone device or may be included, in whole or in part, as a component of a larger device or system.

Figure 6:
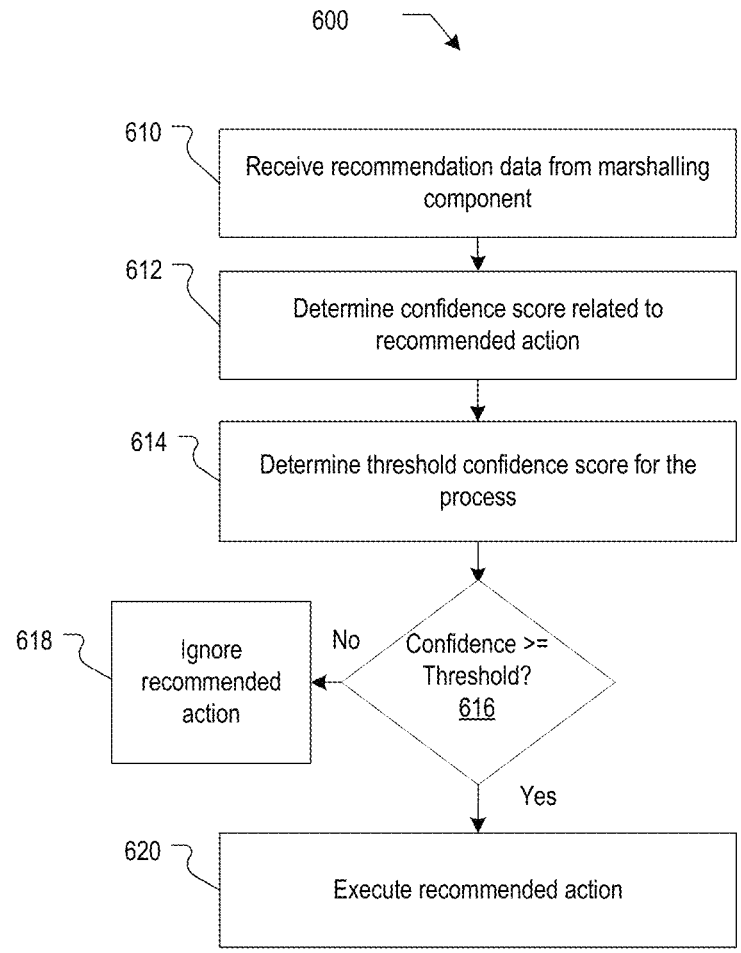
FIG. 6 depicts a flow chart showing an example process for implementing actions recommended by the reinforcement learning system, in accordance with various aspects of the present disclosure.

FIG. 6 depicts a flow chart showing an example process 600 for implementing actions recommended by the reinforcement learning system, in accordance with various aspects of the present disclosure. Those portions of FIG. 6 that have been previously discussed in reference to FIGS. 1-5B may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which recommendation data may be received by NLU component 160 from marshalling component 162. For example, result arbitration component 173 of marshalling component 162 may send recommendation data generated by reinforcement learning model 179 to cross-process merger 199. Processing may continue from action 610 to action 612, at which a confidence score related to a recommended action of the recommendation data may be determined. For example, the recommendation data received from the marshalling component 162 may recommend that processing of Process A be terminated. A 70% confidence score may be associated with the recommendation to terminate processing of Process A. In another example, the recommended action may be to extend a timeout of a process by an additional 100 ms. In this example, a 45% confidence score may be associated with the recommendation to extend the timeout.

Processing may continue from action 612 to action 614, at which a threshold confidence score may be determined. In various examples, the threshold confidence score may be specific to the process to which the recommended action pertains. In various other examples, the threshold confidence score may pertain to all processes and may be instituted by the cross-process merger component 199. In yet other examples, the threshold confidence score may pertain to the particular recommended action and may be process agnostic. In general, use of threshold confidence scores may depend on the particular implementation of the cross-process merger component 199 or a similar system. In some other examples, the cross-process merger component 199 may use one or more machine learning models to determine whether or not to take actions recommended by the reinforcement learning model 179.

At action 616, a determination may be made whether the confidence score for the recommended action is greater than or equal to the pertinent threshold confidence score. If so, processing may continue to action 620, at which the recommended action (e.g., processing termination, return intermediate result, wait for final result, use as fallback result, etc.) may be executed. Conversely, at action 616, if a determination is made that the confidence score is less than the pertinent confidence score threshold, the action recommended by the reinforcement learning model 179 may be ignored at action 618.

Figure 7:
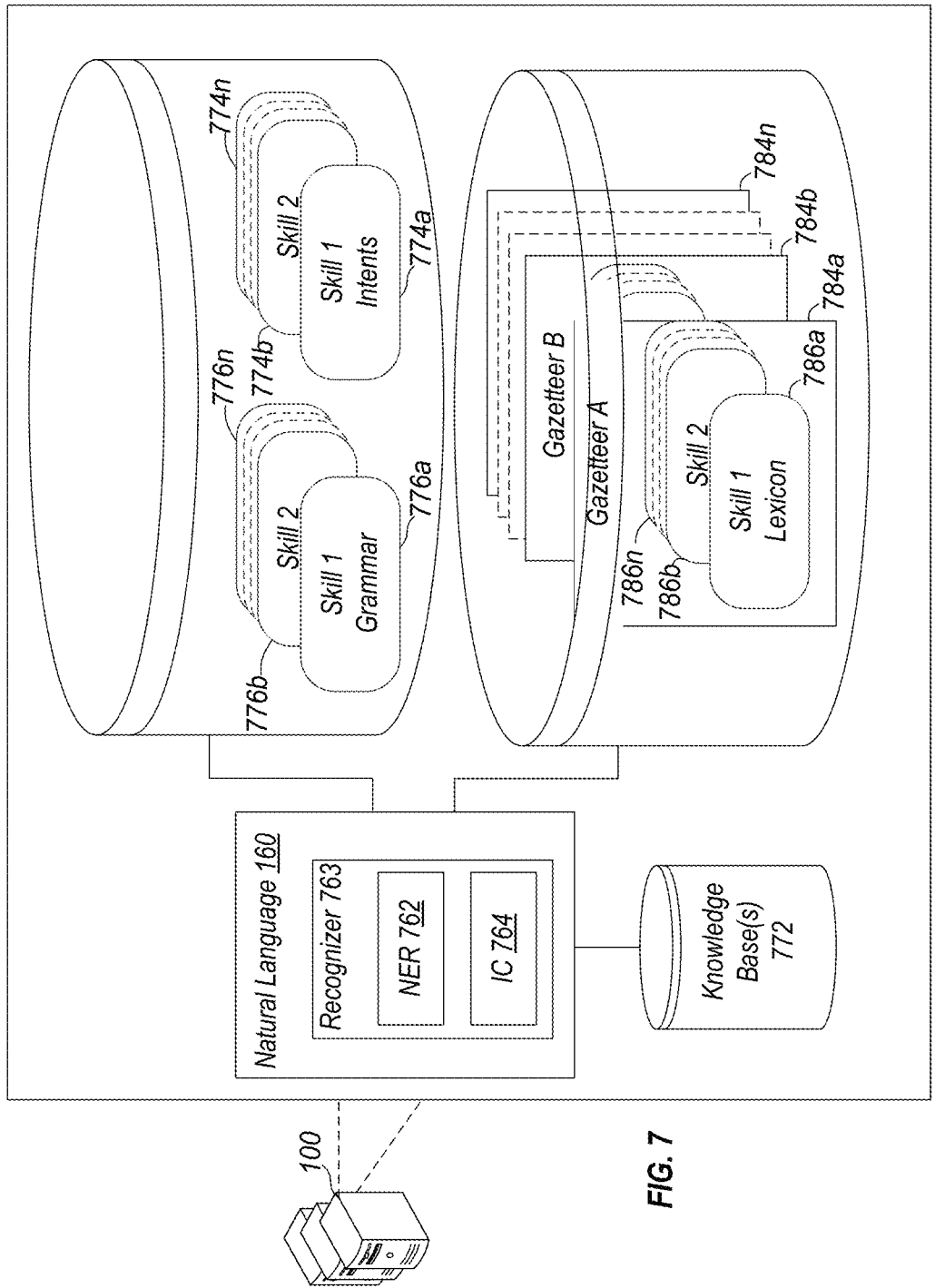
FIG. 7 is a conceptual diagram illustrating how natural language understanding processing is performed according to embodiments of the present disclosure.

FIG. 7 illustrates how NLU processing is performed on text data. Generally, the NLU component 160 attempts to make a semantic interpretation of text data input thereto. That is, the NLU component 160 determines the meaning behind text data based on the individual words and/or phrases represented therein. The NLU component 160 interprets text data to derive an intent of the user as well as pieces of the text data that allow a device (e.g., a speech processing enabled device, the speech processing system 100, etc.) to complete that action. In various examples, multiple different processes may perform the various techniques similar to those described below in parallel to potentially arrive at multiple different semantic interpretations of input text data that may be merged and/or aggregated into a final NLU output result.

The NLU component 160 may process text data including several ASR hypotheses. The NLU component 160 may process all (or a portion of) the ASR hypotheses input therein. Even though the ASR component 150 may output multiple ASR hypotheses, the NLU component 160 may be configured to only process with respect to the top scoring ASR hypothesis. Additionally, as described herein, the ASR component 150 may generate confidence scores associated with each hypothesis.

The NLU component 160 may include one or more recognizers 763. Each recognizer 763 may be associated with a different skill. Each recognizer 763 may process with respect to text data input to the NLU component 160. Each recognizer 763 may operate at least partially in parallel with other recognizers 763 of the NLU component 160.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity that may be applicable to processing performed by a skill. The NER component 762 (or other component of the NLU component 160) may also determine whether a word refers to an entity whose identity is not explicitly mentioned in the text data, for example "him," "her," "it" or other anaphora, exophora or the like.

Each recognizer 763, and more specifically each NER component 762, may be associated with a particular grammar model and/or database, a particular set of intents/actions (e.g., in intents database 774), and a particular personalized lexicon 786. Each gazetteer 784 may include skill-indexed lexical information associated with a particular user and/or speech processing enabled device. For example, a Gazetteer A (784a) includes skill-indexed lexicon 786a to 786n. A user's music skill lexical information might include album titles, artist names, and song names, for example, whereas a user's contact list skill lexical information might include the names of contacts. Since every user's music collection and contact list is presumably different, this personalized information improves entity resolution.

An NER component 762 applies grammar models 776 and lexicon 786 to determine a mention of one or more entities in text data. In this manner, the NER component 762 identifies "slots" (corresponding to one or more particular words in text data) that may be used for later processing. The NER component 762 may also label each slot with a type (e.g., noun, place, city, artist name, song name, etc.). As previously described, each recognizer 763 may generate confidence scores associated with each named entity and/or with each match of a named entity. In at least some examples, pre-computed features generated by the ranking and arbitration component 140 may be used by the NER component 762 and/or by NLU component 160, generally, in order to generate the N-best list of intents and/or skills for processing particular input data.

Each grammar model 776 includes the names of entities (i.e., nouns) commonly found in speech about the particular skill to which the grammar model 776 relates, whereas the lexicon 786 is personalized to the user and/or a speech processing enabled device from which the user input originated. For example, a grammar model 776 associated with a shopping skill may include a database of words commonly used when people discuss shopping.

Each recognizer 763 may also include an intent classification (IC) component 764. An IC component 764 parses text data to determine an intent(s). An intent represents an action a user desires be performed. An IC component 764 may communicate with an intents database 774 of words linked to intents. For example, a music intent database may link words and phrases such as "quiet," "volume off," and "mute" to a <Mute> intent. An IC component 764 identifies potential intents by comparing words and phrases in text data to the words and phrases in an intents database 774.

The intents identifiable by a specific IC component 764 are linked to skill-specific grammar models 776 with "slots" to be filled. Each slot of a grammar model 776 corresponds to a portion of text data that the system believes corresponds to an entity. For example, a grammar model 776 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 776 may not be structured as sentences, but rather based on associating slots with grammatical tags.

For example, an NER component 762 may parse text data to identify words as subject, object, verb, preposition, etc. based on grammar rules and/or models prior to recognizing named entities in the text data. An IC component 764 (e.g., implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786, attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as hidden Markov models, maximum entropy models, log linear models, conditional random fields (CRF), and the like. For example, an NER component 762 implemented by a music recognizer may parse and tag text data corresponding to "play Song Y by the Band X" as {Verb}: "Play," {Object}: "Song Y," {Object Preposition}: "by," and {Object Modifier}: "the Band X." The NER component 762 identifies "Play" as a verb, which an IC component 764 may determine corresponds to a <PlayMusic> intent. At this stage, no determination has been made as to the meaning of "Song Y" and "the Band X," but based on grammar rules and models, the NER component 762 has determined the text of these phrases relates to the grammatical object (i.e., entity) of the user input represented in the text data.

The models linked to the intent are then used to determine what database fields should be searched to determine the meaning of these phrases, such as searching a user's gazetteer 784 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 784 does not resolve a slot/field using gazetteer information, the NER component 762 may search a database of generic words (e.g., in the knowledge base 772). For example, if the text data includes "play songs by the Band X," after failing to determine an album name or song name called "songs" by "the Band X," the NER component 762 may search the database for the word "songs." In the alternative, generic words may be checked before the gazetteer information, or both may be tried, potentially producing two different results.

An NER component 762 may tag text data to attribute meaning thereto. For example, an NER component 762 may tag "play Song Y by the Band X" as: {skill} Music, {intent} <PlayMusic>, {artist name} Band X, {media type} SONG, and {song title} Song Y. For further example, the NER component 762 may tag "play songs by the Band X" as: {skill} Music, {intent}<PlayMusic>, {artist name} Band X, and {media type} SONG.

The NLU component 160 may generate cross-skill N-best list data, which may include a list of NLU hypotheses output by each recognizer 763. A recognizer 763 may output tagged text data generated by an NER component 762 and an IC component 764 operated by the recognizer 763, as described above. Each NLU hypothesis including an intent indicator and text/slots may be grouped as an NLU hypothesis represented in cross-skill N-best list data. Each NLU hypothesis may also be associated with one or more respective confidence score(s) for the NLU hypothesis. For example, the cross-skill N-best list data may be represented as, with each line representing a separate NLU hypothesis:

[0.95] Intent: <PlayMusic> ArtistName: Band X SongName: Song Y

[0.95] Intent: <PlayVideo> ArtistName: Band X VideoName: Song Y

[0.01] Intent: <PlayMusic> ArtistName: Band X AlbumName: Song Y

[0.01] Intent: <PlayMusic> SongName: Song Y

Ranking component 120 may assign a particular confidence score to each NLU hypothesis input therein. As previously described, machine learning models of the ranking component 120 may use precomputed features generated by ranking and arbitration component 140 as inputs along with the cross-skill N-best list data in order to generate the confidence scores for each NLU hypothesis of the cross-skill N-best list data. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the NER component 762.

The ranking component 120 may apply re-scoring, biasing, and/or other techniques to determine the top scoring NLU hypotheses. To do so, the ranking component 120 may consider not only the data output by the NER component 762, but may also consider other data such as skill rating, popularity data, context data, and/or other features computed by ranking and arbitration component 140.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method, comprising:
   receiving first audio data representing a user request by a speech processing-enabled device;
   generating, by an automatic speech recognition (ASR) component, first text data representing the user request;
   determining a first natural language understanding (NLU) process to process the first text data to determine a first semantic interpretation of the first text data using a first set of NLU processing actions associated with the first NLU process;
   determining a second NLU process for processing the first text data to determine a second semantic interpretation of the first text data using a second set of NLU processing actions associated with the second NLU process;
   executing the first NLU process, comprising:
     generating first intermediate NLU result data; and
     generating first feature data from the first intermediate NLU result data;
   executing the second NLU process in parallel with executing the first NLU process, comprising:
     generating second intermediate NLU result data; and
     generating second feature data from the second intermediate NLU result data;
   inputting the first feature data and the second feature data into a reinforcement machine learning model;
   determining, by the reinforcement machine learning model using the first feature data and the second feature data, that the first NLU process is preferred with respect to the second NLU process based on at least one of first accuracy characteristics or first latency characteristics of the first NLU process and based on at least one of second accuracy characteristics or second latency characteristics of the second NLU process;
   determining at least one updated parameter of the reinforcement machine learning model using a reward function;
   determining a first final result from the first NLU process; and
   terminating the second NLU process.

2. The computer-implemented method of claim 1, further comprising:
   determining by a natural language understanding (NLU) arbitration component a threshold confidence score, wherein the threshold confidence score controls whether at least one of the processing of the first NLU process or the second NLU process is interrupted in response to the determining that the first NLU process is preferred with respect to the second NLU process by the reinforcement machine learning model; and
   comparing the threshold confidence score to a first confidence score associated with the determination that the first NLU process is preferred with respect to the second NLU process, wherein the terminating the second NLU process is performed in response to the comparison of the threshold confidence score to the first confidence score.

3. The computer-implemented method of claim 1, further comprising:
   determining a third NLU process for processing the first text data;
   executing the third NLU process in parallel with executing the first NLU process and the second NLU process, comprising:
     generating third intermediate NLU result data;
     generating third feature data from the third intermediate NLU result data;
   determining that the third feature data is different from feature data included in a set of features used by the reinforcement machine learning model; and
   determining, by the reinforcement machine learning model using the third feature data, that the third NLU process is preferred with respect to the second NLU process based on third accuracy characteristics and third latency characteristics of the third NLU process.

4. The computer-implemented method of claim 1, further comprising:
   determining that the first NLU process will experience a timeout at a first time prior to a second time at which the first final result is determined; and
   extending the timeout from the first time to a third time, wherein the second time is between the first time and the third time.

5. A method comprising:
   receiving first input data by a speech processing system;

executing a first natural language understanding (NLU) process for processing the first input data, wherein the first NLU process comprises a first set of NLU processing actions;
executing a second NLU process for processing the first input data, wherein the second NLU process comprises a second set of NLU processing actions different from the first set of NLU processing actions;
determining, using a first machine learning model, a first recommended action for processing the first input data by the first NLU process, wherein the first recommend action is effective to optimize at least one of the first NLU process or the second NLU process based on at least one of latency, accuracy, or performance; and
sending the first recommended action to a natural language processing component executing at least one of the first NLU process or the second NLU process.

6. The method of claim 5, further comprising:
determining first intermediate NLU result data from processing, by the first NLU process, the first input data;
determining second intermediate NLU result data from processing, by the second NLU process, the first input data;
generating first feature data from the first intermediate NLU result data;
generating second feature data from the second intermediate NLU result data; and
inputting the first feature data and the second feature data into the first machine learning model, wherein the first recommended action is determined based at least in part on the first feature data and the second feature data.

7. The method of claim 5, further comprising:
determining, by the first machine learning model, first data indicating that the first NLU process generates a first appropriate output from processing the first input data;
determining, by the first machine learning model, second data indicating that the second NLU process is unlikely to generate a second appropriate output from processing the first input data; and
terminating the second NLU process prior to generation of a final output by the second NLU process.

8. The method of claim 5, further comprising:
determining that a predetermined timeout for the first NLU process will be reached prior to generating a first final output of the first NLU process;
terminating the first NLU process prior to reaching the predetermined timeout; and
generating, by the second NLU process, a second final output of the second NLU process.

9. The method of claim 5, further comprising:
determining a third NLU process for processing the first input data in parallel with the first NLU process and the second NLU process;
determining first intermediate NLU result data from processing, by the first NLU process, the first input data;
determining second intermediate NLU result data from processing, by the second NLU process, the first input data;
generating first feature data using the first intermediate NLU result data;
generating second feature data using the second intermediate NLU result data;
determining first feedback data related to past processing of data by the third NLU process;
determining, by the first machine learning model, first data indicating that the first NLU process generates a first appropriate output from processing the first input data based at least in part on the first feature data;
determining, by the first machine learning model, second data indicating that the second NLU process generates a second appropriate output from processing the first input data based at least in part on the second feature data; and
determining, by the first machine learning model, third data indicating that the third NLU process generates a third appropriate output from processing the first input data based at least in part on the first feedback data.

10. The method of claim 5, further comprising:
determining first intermediate NLU result data from processing, by the first NLU process, the first input data;
determining metadata associated with the first intermediate NLU result data indicating that a subsequent operation of the first NLU process is associated with a first cost; and
terminating the first NLU process prior to the subsequent operation, based at least in part on the first cost.

11. The method of claim 5, further comprising:
determining, by the first machine learning model, first data indicating that the first NLU process generates a first appropriate output from processing the first input data;
determining, by the first machine learning model, second data indicating that the second NLU process generates a second appropriate output from processing the first input data;
determining that the second NLU process will generate second output data prior to the first NLU process generating first output data; and
generating, by the first NLU process, the first output data.

12. The method of claim 5, further comprising:
determining a third NLU process for processing the first input data;
determining, by the first machine learning model, first data indicating that the first NLU process generates a first appropriate output from processing the first input data;
determining, by the first machine learning model, second data indicating that the second NLU process generates a second appropriate output from processing the first input data;
determining, by the first machine learning model, third data indicating that the third NLU process generates a third appropriate output from processing the first input data;
determining, based at least in part on the first data, that first output of the first NLU process is primary output;
determining, based at least in part on the second data, that second output of the second NLU process is fallback output; and
generating, based at least in part on a third confidence score, a recommendation to terminate the third NLU process prior to generating third output.

13. A computing device, comprising:
at least one processor; and
at least one non-transitory computer-readable memory storing instructions that, when executed by the at least one processor, program the at least one processor to:
receive first input data by a speech processing system;
execute a first natural language understanding (NLU) process for processing the first input data, wherein the first NLU process comprises a first set of NLU processing actions;

execute a second NLU process for processing the first input data, wherein the second NLU process comprises a second set of NLU processing actions different from the first set of NLU processing actions;

determine, using a first machine learning model, a first recommended action for processing the first input data by the first NLU process, wherein the first recommend action is effective to optimize at least one of the first NLU process or the second NLU process based on at least one of latency, accuracy, or performance; and send the first recommended action to a natural language processing component executing at least one of the first NLU process or the second NLU process.

14. The computing device of claim 13, the at least one non-transitory computer-readable memory storing further instructions that, when executed by the at least one processor program the at least one processor to:

determine first intermediate NLU result data from processing, by the first NLU process, the first input data;

determine second intermediate NLU result data from processing, by the second NLU process, the first input data;

generate first feature data from the first intermediate NLU result data;

generate second feature data from the second intermediate NLU result data; and input the first feature data and the second feature data into the first machine learning model, wherein the first recommended action is determined based at least in part on the first feature data and the second feature data.

15. The computing device of claim 13, the at least one non-transitory computer-readable memory storing further instructions that, when executed by the at least one processor program the at least one processor to:

determine, by the first machine learning model, first data indicating that the first NLU process generates a first appropriate output from processing the first input data;

determine, by the first machine learning model, second data indicating that the second NLU process is unlikely to generate a second appropriate output from processing the first input data; and terminate the second NLU process prior to generation of a final output by the second NLU process.

16. The computing device of claim 13, the at least one non-transitory computer-readable memory storing further instructions that, when executed by the at least one processor program the at least one processor to:

determine that a predetermined timeout for the first NLU process will be reached prior to generating a first final output of the first NLU process;

terminate the first NLU process prior to reaching the predetermined timeout; and generate, by the second NLU process, a second final output of the second NLU process.

17. The computing device of claim 13, the at least one non-transitory computer-readable memory storing further instructions that, when executed by the at least one processor program the at least one processor to:

determine a third NLU process for processing the first input data in parallel with the first NLU process and the second NLU process;

determine first intermediate NLU result data from processing, by the first NLU process, the first input data;

determine second intermediate NLU result data from processing, by the second NLU process, the first input data;

generate first feature data using the first intermediate NLU result data;

generate second feature data using the second intermediate NLU result data;

determine first feedback data related to past processing of data by the third NLU process;

determine, by the first machine learning model, first data indicating that the first NLU process generates a first appropriate output from processing the first input data based at least in part on the first feature data;

determine, by the first machine learning model, second data indicating that the second NLU process generates a second appropriate output from processing the first input data based at least in part on the second feature data; and determine, by the first machine learning model, third data indicating that the third NLU process generates a third appropriate output from processing the first input data based at least in part on the first feedback data.

18. The computing device of claim 13, the at least one non-transitory computer-readable memory storing further instructions that, when executed by the at least one processor program the at least one processor to:

determine first intermediate NLU result data from processing, by the first NLU process, the first input data;

determine metadata associated with the first intermediate NLU result data indicating that a subsequent operation of the first NLU process is associated with a first cost; and terminate the first NLU process prior to the subsequent operation, based at least in part on the first cost.

19. The computing device of claim 13, the at least one non-transitory computer-readable memory storing further instructions that, when executed by the at least one processor program the at least one processor to:

determine, by the first machine learning model, first data indicating that the first NLU process generates a first appropriate output from processing the first input data;

determine, by the first machine learning model, second data indicating that the second NLU process generates a second appropriate output from processing the first input data;

determine that the second NLU process will generate second output data prior to the first NLU process generating first output data; and generate, by the first NLU process, the first output data.

20. The computing device of claim 13, the at least one non-transitory computer-readable memory storing further instructions that, when executed by the at least one processor program the at least one processor to:

determine a third NLU process for processing the first input data;

determine, by the first machine learning model, first data indicating that the first NLU process generates a first appropriate output from processing the first input data;

determine, by the first machine learning model, second data indicating that the second NLU process generates a second appropriate output from processing the first input data;

determine, by the first machine learning model, third data indicating that the third NLU process generates a third appropriate output from processing the first input data;

determine, based at least in part on the first data, that first output of the first NLU process is primary output;

determine, based at least in part on the second data, that second output of the second NLU process is fallback output; and generate, based at least in part on a third confidence score, a recommendation to terminate the third NLU process prior to generating third output.

\* \* \* \* \*